United States Patent [19]

Morimoto et al.

[11] Patent Number: 4,636,905
[45] Date of Patent: Jan. 13, 1987

[54] VOLTAGE MONITORING SYSTEM FOR AN ELECTRIC POWER SOURCE OF A DISC DRIVE

[75] Inventors: Atsutaka Morimoto, Kanagawa; Shoji Takahashi, Saitama, both of Japan

[73] Assignee: Citizen Watch Co., Ltd., Tokyo, Japan

[21] Appl. No.: 791,895

[22] Filed: Oct. 28, 1985

[30] Foreign Application Priority Data

Oct. 31, 1984 [JP] Japan .................. 59-229396

[51] Int. Cl.$^4$ ............................................. G11B 19/04
[52] U.S. Cl. ................................. 360/137; 360/69; 360/75; 360/60
[58] Field of Search ............... 360/137, 69, 97-99, 360/86, 71, 75, 60, 106, 31, 55, 61, 62; 364/184, 707; 365/195, 227, 228

[56] References Cited

FOREIGN PATENT DOCUMENTS 0123849 11/1984 European Pat. Off. ............ 360/106
0152071 8/1985 European Pat. Off. ............ 360/75
57-100616 6/1982 Japan ................................. 360/137

OTHER PUBLICATIONS

IBM TDB, vol. 20, No. 8, "Magnetic-Recording Write-Current Shutdown Upon Power Failure" Nomura, 1/78, pp. 3241-3242.
IEEE Trans. on Magnetics, vol. 14, No. 4, "Microprocessor Applications in Disk Storage Systems" Johann, 7/78, pp. 203-206.

Primary Examiner—Aristotelis M. Psitos
Assistant Examiner—Steven R. Garland
Attorney, Agent, or Firm—Koda and Androlia

[57] ABSTRACT

The monitoring system includes two voltage detectors, each of which has hysteresis, wherein write, read, head feeding operations, and a motor driving function can be performed when the power source is in excess of an upper reset level, and, when the voltage decreases below an upper set level, writing is inhibited while the other operations can still be performed, and when the voltage further decreases below a lower set level operation of the entire drive is inhibited.

3 Claims, 2 Drawing Figures

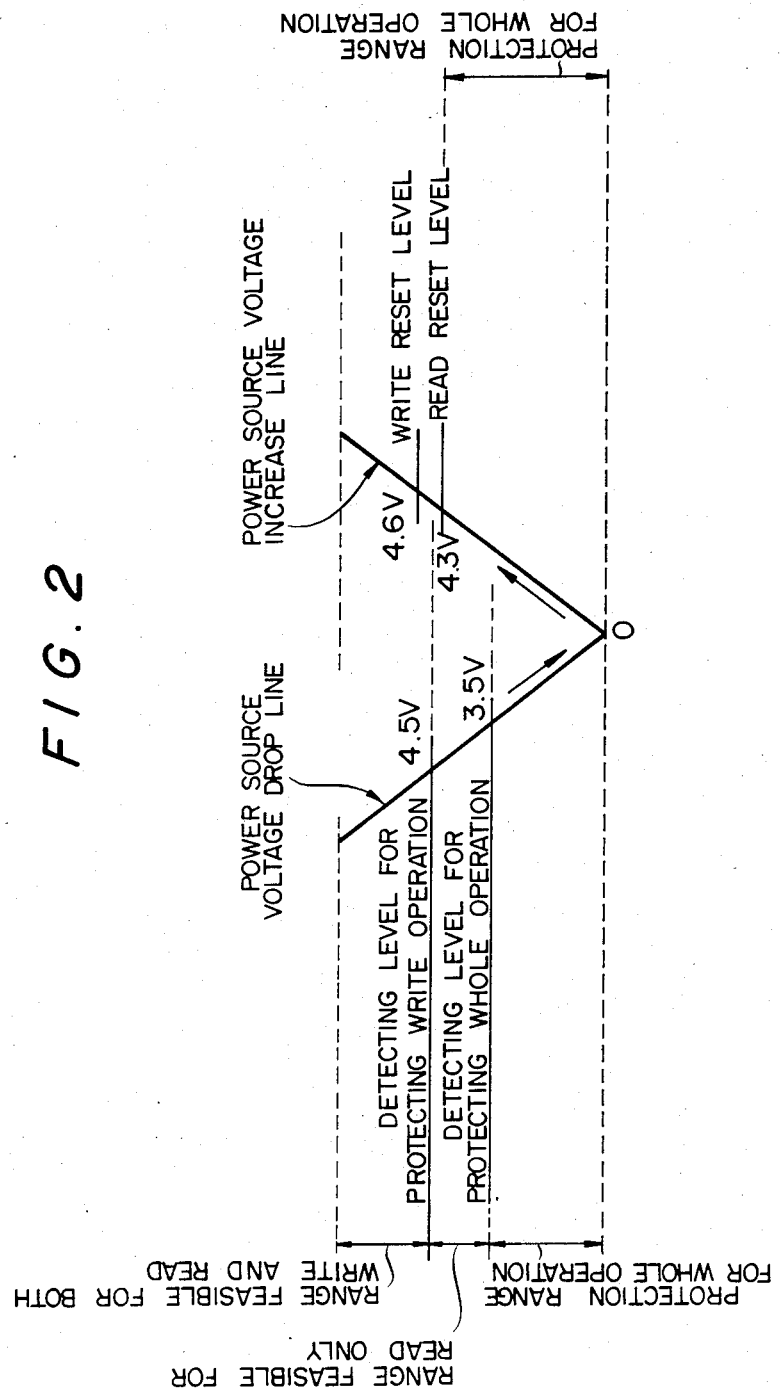

VOLTAGE MONITORING SYSTEM FOR AN ELECTRIC POWER SOURCE OF A DISC DRIVE

BACKGROUND OF THE INVENTION

1. Field of the Invention

The present invention relates to a voltage monitoring system of electric power source for floppy disk drive circuit and more particularly to a voltage monitoring system for battery driven small size floppy disk drive circuit.

2. Description of the Prior Art

There are known various information recording media used as external memories for computers. Among them, magnetic disks are currently utilized since they are randomly accessible and easily handled. Recently, a so-called floppy disk has been developed which includes a substrate of flexible plastic sheet having one or two faces coated with magnetically storing layers. The floppy disk is increasingly used over the broad range of applications since it has many advantages, for example, in that the floppy disk is cheaper than hard disks and in that the floppy disk can easily be changed to another floppy disk to increase the capacity of memory.

More recently, a so-called cartridge type microfloppy disk has been developed in which a floppy disk as an information recording medium is contained within a cartridge of hard plastic casing or the like. This is advantageous in that the floppy disk can extremely easily and simply be carried and handled while preventing the recording face(s) thereof from being damaged and contaminated by any foreign matters. Such a micro-floppy disk cartridge is broadly being utilized as an excellent external memory in small-size computers and particularly personal and domestic computers.

In the micro-floppy disk cartridge, the micro-floppy disk is housed within a hard plastic casing which has a shutter mechanism for preventing the READ/WRITE faces of the disk from being exposed to protect the recording faces substantially completely from any foreign matters. Thus, a user can handle the floppy disk without his additional attention to the damage and contamination of the recording faces in the floppy disk. The micro-floppy disk cartridge also is mailable.

In order to most utilize the advantages of the micro-floppy disk cartridge, a floppy disk drive therefor must have various new performances different from those of the conventional 8-inch floppy disk drive. Main requirements to the micro-floppy disk drive is that it can be reduced in size and can be operated with the minimum power consumption.

Computers themselves are remarkably being reduced in size while increasing their processing speed and capacity. It is thus known that the entire size of a computer system depends on the dimension and arrangement of a keyboard, monitor and external memory. Consequently, the micro-floppy disk drive should necessarily be reduced in size and operated with the minimum power consumption such that a portable micro-computer can be realized.

In the above floppy disk drive with a minimum power consumption, monitoring of electric power source is required to maintain a stable read/write operation of the floppy disk drive.

In the monitoring system in the prior art prepared therein was single detector which detects one predetermined minimum standard level of voltage for each electric power supply system. In power supply circuits supplying 5 V (Volts) and 12 V for activating a floppy disk drive, for example, the minimum standard voltage from 3.4 V to 3.8 V was picked up for the detecting level in the 5 V power supply system, and the second minimum standard voltage from 10.5 V to 11 V was picked up for the detecting level for the 12 V power supply system. One detecting level was established in each of the 5 V and 12 V power supply systems.

In the floppy disk drive circuit in the prior art, electric power was supplied from a stabilized power supply with the guaranteed accuracy of ±5%. The voltage supplied from such power supply was kept stabilized in the normal state. Even if abnormal state occurred in the prior art, the voltage drop mode was established in such that the voltage suddenly dropped to 0 or to the extremely lower voltage. Accordingly, monitoring level of the voltage in the electric power supply was sufficient to establish at one level with which the disk driving operation can be guaranteed, and the circuit operation can be protected in an abnormal state that the voltage was detected to be lower than such level.

However, considering that the floppy disk is getting popular among portable gears as is seen nowadays, it is indispensable to use batteries for the electric power source. The battery gradually drops its power comparatively in a short while. Therefore, one level monitoring method of the voltage in the electric power source will cause the problem in establishment of such level when we are going to use the battery as long as possible.

Specifically, as the power source voltage drops down in the floppy disk drive, the write operation becomes inaccurate at the beginning. Further drop of the voltage makes the read (reproducing) operation and/or the motor drive becomes unstable. When the level is established at the single voltage which guarantees the firm write operation, the voltage lower than this level determines to be out of the useable range by means of one level monitoring method, and the battery can be only used for an extremely short period, which causes in frequent exchange of batteries.

On the contrary, when the detecting level is established at as low value as guarantees the read (reproducing) operation, and the operations of a circuit driving a stepping motor to feed a head and a logic circuit in order to expand the useable period of battery voltage, there will be such problems for memory devices that the inaccurate write operation makes incorrect recording and that the correct data already written in are possibly destroyed, since there exists non-protection area therein for the write operation.

SUMMARY OF THE INVENTION

Accordingly, it is an object of the present invention to provide a monitoring system of the voltage in the electric power source applicable to a battery use floppy disk drive.

In keeping with the principles of the present invention, the object is accomplished with the monitoring system in which the voltage of the electric power source can be monitored at two level values, each of which has hysteresis.

The circuit is composed in such a way that all of the floppy disk drive functions can be enable in the operative stage throughout the circuit diagram, when the detected voltage is in excess of the upper level. If the voltage goes down under the upper level, the protection circuit works to stop supplying the electric current to the write and the erase circuits. Furthermore, when the voltage goes down than ever to pass the lower level, the circuit is composed as such that all of the circuit operation including write, read and motor drives are shut down not to have these drive units be in incorrect state.

The system mentioned above enables write protection to work just before the voltage of the electric power supply drops down to cause in unstable write operation. Furthermore, even if the power supply goes down under the voltage in which the write operation cannot be performed, the battery need not be treated as the end of its life at this stage, but can be used in further lower voltage to perform the read operation, the stepping motor drive to feed the head, etc.

Taking account of the floppy disk drive usage, such monitoring system of the voltage in the electric power source is sufficiently advantageous in practical use, since there are many occasions when the disk drive is used only for the read operation.

BRIEF DESCRIPTION OF DRAWINGS

FIG. 2 is an illustration describing the relation between the voltage line of the electric power source and the voltage detecting levels.

DETAILED DESCRIPTION OF THE EMBODIMENT

Figure 1:
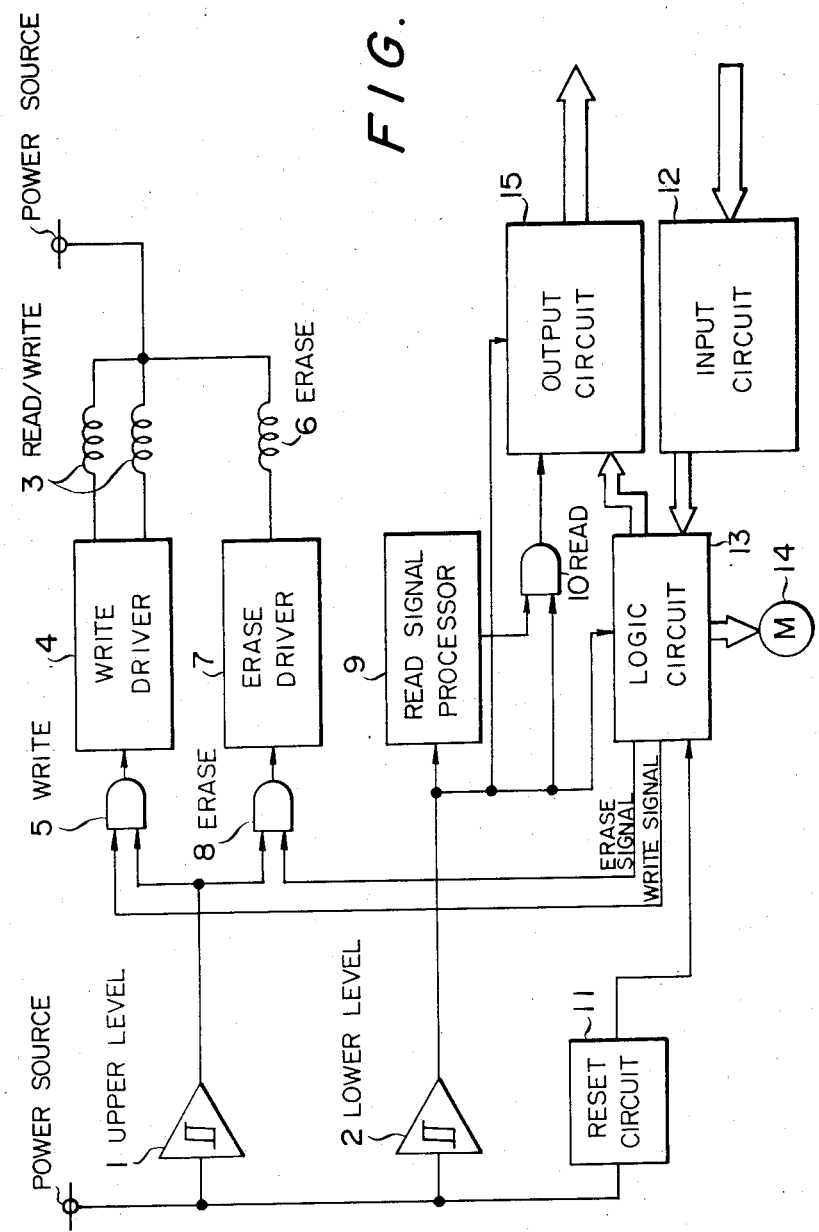
FIG. 1 is a circuit diagram showing a function of the present invention.

As shown in FIG. 1, the floppy disk drive according to the embodiment of the present invention includes an upper level voltage detector 1, a lower level voltage detector 2, a read/write head 3 to which a write electric current driver 4 supplies recording electric current, a write gate circuit 5 which activates as a gate for the input of the driver 4, an erase head 6 to which an erase electric current driver 7 supplies erasing electric current, an erase gate circuit 8 which activates as a gate for the input of the driver 7, a read signal processor 9 which processes the read signal picked up through the read/write head 3 in the read operation, a read pulse gate circuit 10 which activates as a gate for read output signal from the read signal processor 9, a reset circuit 11 outputting a signal which initializes the logic circuit system when the electric power source is switched on, an input circuit 12 receiving signals from a host computer system or a sensor, etc., a logic circuit 13 controlling all of the floppy disk drive operation by the input signals, a stepping motor 14 to feed the head to a predetermined position, and an output circuit 15 outputting signals from the floppy disk drive side to the host system.

The present invention is characterized in that two voltage detecting levels of upper level and lower level are provided to monitor the fluctuation of the voltage in the power source.

The upper level voltage detector 1 turns the output thereof into "L" level from normal "H" level, when it detects that the power supply voltage drops down under 4.5 V (upper set level) for example, and, on the contrary, the output of the detector is turned into "H" level, when it detects that the power supply voltage increases to exceed 4.6 V (upper reset level). At this point, between the both detecting levels there is provided the hysteresis of 0.1 V in order to prevent the ON and OFF chattering action by detection of small fluctuating voltage in the power supply caused by the slight noise which could be included in the power supply system.

In the same manner, the lower level voltage detector 2 has a lower set level of 3.5 V and a lower reset level of 4.3 V for attainment of necessary hysteresis characteristic to prevent the false voltage fluctuation with outer noises.

In the embodiment, when the voltage maintains to exceed 4.5 V, the output of "H" level in the upper level voltage detector 1 opens the gates of the write gate circuit 5 and the erase gate circuit 8. Therefore, when the signal from the host system actuates the logic circuit 13 to output the write signal and the erase signal toward the gate circuits 5 and 8 respectively, these two signals are respectively supplied to the write electric current driver 4 and the erase electric current driver 7 to flow the write electric current to the read/write head and the erase electric current to the erase head at the predetermined timing.

The read signal processor 9 is composed not to be affected by the upper level voltage detector 1, accordingly the read operation can be performed undoubtedly during the power supply voltage stays to be over 4.5 V.

In the next place when the battery voltage gradually drops down to be less than 4.5 V (upper set level), the upper level voltage detector 1 detects the lower voltage than the established value to turn the output into "L" level. Consequently, the write gate circuit 5 and the erase gate circuit 8 become "L" in their one input to close the gates against the write signal and the erase signal, and the electric current does not supply to the respective heads. That is to say, in general, during lower voltage even slightly than predetermined value, the slow rise time in the write electric current wave form operates incorrect data write operation in most cases, and the apparatus in this invention is composed as such that the incorrect write operation is never performed at the voltage under the predetermined voltage (upper set level).

Even when the voltage slightly goes down under 4.5 V, the logic circuit 13 still works in the normal condition and the read circuit system can perform sufficient signal processing. Therefore, the read operation, the head feeding, etc. other than the write operation can be performed without any problem.

Furthermore, when the lower level voltage detector 2 detects the further lower dropped voltage to be less than 3.5 V (lower set level), the output of the detector 2 becomes "L" level, the signal of which stops operating the read signal processor 9, or outputting the signal to the output circuit 15 by gating the read pulse signal supplied from the read signal processor 9 at the read pulse gate circuit 10, and further locks the logic circuit 13 in the initial state. Thus, whole operation of floppy disk drive turns off within the voltage lower than 3.5 V.

On the other hand, when the power supply voltage increases by a battery charging or the else, in the embodiment, the reset level of the lower level voltage, detector 2 is established at the level of possibly over 3.5 V (lower set level) and slightly lower than 4.5 V (upper set level), i.e. 4.3 V. When the power voltage or charged voltage increases to exceed the lower reset level, 4.3 V, the output of the lower level voltage detector 2 returns to "H" level and the read operation can be again started. Since the internal resistance is increasing so much in this low voltage region in the battery power source that changes of the electric current vary the internal voltage drop ratio to fluctuate the voltage of the electric power source, and so as to intend to make the detector 2 reciprocally outputting the read enable and the read inhibit signals repeatedly, the hysteresis between ON and OFF in the lower level is established as large as possible to prevent such oscillating state as 0.8 V in the embodiment, for example.

Furthermore, when the power supply voltage increases to exceed 4.6 V, all of the circuits can return to be operational.

As described heretofore, according to the present invention, as two level voltage detection can monitor whether at an upper voltage, the write operation can be performed or not, and, at a lower voltage, whether the read operation can be performed or all of the operation cannot be performed so that each of the circuits can be functionable with as low voltage as possible, the floppy disk drive can be realized with wide range of electric power source voltage in the systems using the electric power supply which is gradually dropping its voltage like the battery power source, which effectively extends the battery using life and advantageously makes the battery exchange less frequently.

What is claimed are:

1. Voltage monitoring system for an electric power source of a floppy disk drive wherein said disk drive includes a write means, read means, head feeding means and motor driving means, said system comprising;

an upper level voltage detector having two predetermined reference levels to obtain a hysteresis characteristic defined with a upper set level and a upper reset level which is higher than the upper set level, and firstly comparing the voltage of the electric power source in a decreasing state with the upper set level in order to turn off a write operation, and further secondly comparing the voltage in an increasing state with the upper reset level in order to enable the write operation, a lower level voltage detector having two predetermined reference levels being established as lower than the reference values in the upper level voltage detector to obtain a hysteresis characteristic defined with a lower set level and a lower reset level which is higher than the lower set level, and firstly comparing the voltage in a decreasing state with the lower set level in order to turn off a read operation, head feeding operation and motor driving function, and further secondly comparing the voltage in an increasing state with the lower reset level in order to enable the read, head feeding operations and motor driving function.

2. Voltage monitoring system for an electric power source of a floppy disk drive claimed in claim 1, wherein the electric power source comprises a battery.

3. Voltage monitoring system for an electric power source of a floppy disk drive claimed in claim 1 or 2, wherein further comprising;

a write gate circuit controlling the supply of a write signal to a write head in virtue of the output of the upper level voltage detector, a read pulse gate circuit controlling the outputting of a read signal in virtue of the output of the lower level voltage detector.

* * * * *